United States Patent
Jasperson

(10) Patent No.: US 9,438,659 B2
(45) Date of Patent: Sep. 6, 2016

(54) SYSTEMS FOR SERVING WEBSITE CONTENT ACCORDING TO USER STATUS

(75) Inventor: Harry Jasperson, Highlands Ranch, CO (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 344 days.

(21) Appl. No.: 13/529,950

(22) Filed: Jun. 21, 2012

(65) Prior Publication Data

US 2013/0346475 A1   Dec. 26, 2013

(51) Int. Cl.
*G06F 15/16* (2006.01)
*H04L 29/08* (2006.01)
*G06F 17/30* (2006.01)
*H04L 29/06* (2006.01)

(52) U.S. Cl.
CPC ......... *H04L 67/02* (2013.01); *G06F 17/30861* (2013.01); *H04L 67/142* (2013.01); *H04L 63/08* (2013.01); *H04L 67/2842* (2013.01)

(58) Field of Classification Search
CPC ............................... G06F 15/16; G06F 17/30
USPC ........................................................ 709/203
See application file for complete search history.

(56) References Cited

U.S. PATENT DOCUMENTS

| | | |
|---|---|---|
| 6,256,633 B1 | 7/2001 | Dharap |
| 6,263,447 B1 | 7/2001 | French et al. |
| 6,286,045 B1 | 9/2001 | Griffiths et al. |
| 6,304,913 B1 | 10/2001 | Rune |
| 6,353,849 B1 | 3/2002 | Linsk |
| 6,539,375 B2 | 3/2003 | Kawasaki |
| 6,591,265 B1 | 7/2003 | Erickson et al. |
| 6,598,077 B2 | 7/2003 | Primak et al. |
| 6,606,643 B1 | 8/2003 | Emens et al. |
| 6,615,258 B1 | 9/2003 | Barry et al. |
| 6,625,643 B1 | 9/2003 | Colby et al. |
| 6,671,715 B1 | 12/2003 | Langseth et al. |
| 6,789,103 B1 | 9/2004 | Kim et al. |
| 6,842,769 B1 | 1/2005 | Kim et al. |
| 6,868,444 B1 | 3/2005 | Kim et al. |
| 7,359,935 B1 | 4/2008 | Karipides et al. |
| 7,392,321 B1 | 6/2008 | Wolf et al. |
| 7,647,387 B2 | 1/2010 | Bellare et al. |
| 8,706,800 B1 * | 4/2014 | Ahmed et al. ................ 709/203 |
| 2002/0035611 A1 | 3/2002 | Dooley |
| 2002/0129026 A1 | 9/2002 | Reardon |
| 2002/0169890 A1 | 11/2002 | Beaumont et al. |
| 2002/0178381 A1 | 11/2002 | Lee et al. |
| 2003/0037261 A1 | 2/2003 | Meffert et al. |

(Continued)

*Primary Examiner* — Vivek Srivastava
*Assistant Examiner* — Sibte Bukhari
(74) *Attorney, Agent, or Firm* — Quarles & Brady LLP

(57) ABSTRACT

An example embodiment of a system for accelerating hosting performance may comprise one or more databases and one or more server computers communicatively coupled to a network. For each of one or more web applications hosted on the one or more servers, the one or more databases may store a signature comprising a regular expression pattern indicating a status of a user of the web application. The status of the user may further indicate that the one or more servers and/or web applications are able to perform one or more actions. The one or more servers may determine whether the request includes a browser cookie. If so, the one or more proxy servers may determine whether the browser cookie matches the regular expression pattern for that web application. If the browser cookie matches the regular expression pattern, the user will be considered authenticated and the request for action will be processed accordingly.

20 Claims, 7 Drawing Sheets

(56) References Cited

U.S. PATENT DOCUMENTS

| | | |
|---|---|---|
| 2004/0054793 A1 | 3/2004 | Coleman |
| 2004/0102197 A1 | 5/2004 | Dietz |
| 2004/0249650 A1 | 12/2004 | Freedman et al. |
| 2006/0047725 A1 | 3/2006 | Bramson |
| 2006/0245433 A1 | 11/2006 | Berg et al. |
| 2007/0174255 A1 | 7/2007 | Sravanapudi et al. |
| 2007/0283005 A1 | 12/2007 | Beliles et al. |
| 2009/0042537 A1 | 2/2009 | Gelbman et al. |
| 2009/0182884 A1 | 7/2009 | Datta et al. |
| 2009/0265774 A1 | 10/2009 | Malik et al. |
| 2012/0117267 A1* | 5/2012 | Holloway et al. ............ 709/233 |

* cited by examiner

SYSTEMS FOR SERVING WEBSITE CONTENT ACCORDING TO USER STATUS

CROSS REFERENCE TO RELATED PATENT APPLICATIONS

This patent application is related to U.S. patent application Ser. No. 13/529,967 entitled: "SERVING WEBSITE CONTENT ACCORDING TO USER STATUS" concurrently filed herewith and also assigned to Go Daddy Operating Company, LLC.

FIELD OF THE INVENTION

The present inventions generally relate to Internet hosting and, more particularly, methods and systems for improving and accelerating hosting performance via one or more servers performing an action based on a user's status, the user's status being determined by comparing a browser cookie for a web application with a crafted regular expression pattern.

SUMMARY OF THE INVENTION

An example embodiment of a system for accelerating hosting performance may comprise one or more databases and one or more server computers communicatively coupled to a network. For each of one or more web applications hosted on the one or more servers, the one or more databases may store in association a text string identifying one of the web applications and a signature comprising a regular expression pattern indicating a status of a user (e.g. authenticated, a valid user and not a bot, logged in, using a visitor account, etc.) of the web application. The status of the user may further indicate that the one or more servers and/or web applications are able to perform one or more actions. The one or more servers may be running one or more proxy servers configured to receive a request from a client computer for an action to be performed by the one or more servers (e.g. update information, log a comment on a website, fetch a static and/or dynamic component of web content from the servers, log a purchase via a shopping cart on a website, etc.), and may determine whether the request includes a browser cookie. If so, the one or more proxy servers may determine whether the browser cookie matches the regular expression pattern for that web application. If the browser cookie matches the regular expression pattern, the user will be considered authenticated and the request for action will be processed accordingly.

An example embodiment of a method for accelerating hosting performance may comprise the steps of hosting one or more web applications on one or more servers, storing in association a text string identifying each of the web applications and a signature comprising a regular expression pattern indicating the status of a user, receiving a request to perform an action and determining whether the request includes a browser cookie. If so, the one or more servers may determine whether the browser cookie matches the regular expression pattern for that web application. If the browser cookie matches the regular expression pattern, the user will be considered authenticated and the request for action will be processed accordingly.

The above features and advantages of the present inventions will be better understood from the following detailed description taken in conjunction with the accompanying drawings.

DETAILED DESCRIPTION

Figure 1:
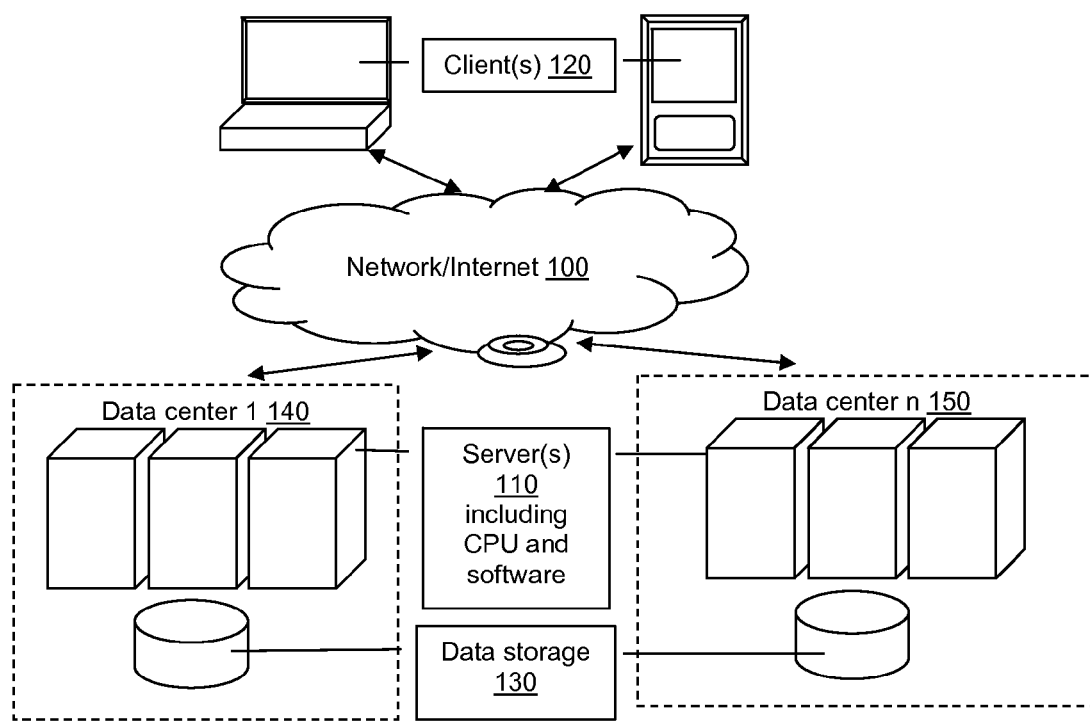
FIG. 1 is a system environment illustrating a possible embodiment of a system for improving and accelerating hosting performance.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as web pages. Websites comprise a collection of connected or otherwise related, web pages. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Menus and links may be used to move between different web pages within the website or to move to a different website as is known in the art. The interconnectivity of web pages enabled by the Internet can make it difficult for Internet users to tell where one website ends and another begins. Websites may be created using Hypertext Markup Language (HTML) to generate a standard set of tags that define how the web pages for the website are to be displayed. Such websites may comprise a collection of HTML and subordinate documents (i.e., files) stored on the Web that are typically accessible from the same Uniform Resource Locator (URL) and reside on the same server, although such files may be distributed on numerous servers.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Users of the Internet may access content providers' websites using software known as an Internet browser, such as MICROSOFT INTERNET EXPLORER or MOZILLA FIREFOX. After the browser has located the desired webpage, it may request and receive information from the web page, typically in the form of an HTML document, and may display the web page content for the user. The user then may view other web pages at the same website or move to an entirely different website using the browser.

Information may be exchanged between a client machine and a server by way of a network protocol known as Hypertext Transfer Protocol (HTTP). A client computer may use this protocol to request action. As a non-limiting example, an Internet browser may request web content from a web server hosted on one or more server computers. Such requests may be in the form of a GET or a POST. A simple example of a GET may include a submission of a URL by a browser to receive and display web content. The GET request may also involve additional information in the query string of the URL (e.g. everything after ".com" in the URL "mydomain.com/?long=string&of =stuff").

A POST may contain data, generally hidden from the user, in the header space of the request. This header space typically originates from a user requesting one or more servers to perform some action, such as logging a user into a user account. The user may trigger a request for this action by clicking a "submit button" on an HTML form on a web page. The request, including the header space, may then be sent to the one or more servers.

HTTP is a stateless protocol. In other words, for each interaction between a user and a website, the connection is not held open for the duration of a user's session. The browser may send a GET or POST request to a web server tier in a multi-tier server architecture, the web server may respond appropriately to the request and the connection may be closed. Subsequent requests or interactions may be handled over a new connection between the client browser and software on the servers.

To preserve the "session state" for subsequent website interactions, a "browser cookie" may include and store information about an inbound connection between the browser and the web server tier. The information within the browser cookie may originate from one or more web applications hosted on one or more servers and may be stored on the client computer when the client computer has accessed the one or more web applications. Once the session state information in the browser cookie is passed from the web server tier to the browser on the client computer, the cookie may preserve the session state within the browser.

The client computer may then store, maintain and deliver the browser cookie after accessing the one or more web applications. The web application may use the browser cookie to maintain session state for the inbound connection between the browser and the web server tier. The browser cookie may include one or more characteristics about the web application in use by the user. In other words, the cookies set by these web applications may be thought of as "signatures" for the major web applications that comprise a majority of hosting installs on the one or more servers. A non-limiting example of web application characteristics may include the session state for the web application.

The browser cookie may also maintain information about the user's session. The browser cookie may describe one or more characteristics about the user that made the request for action. The user information stored within the cookie may include an identity of the user, one or more actions performed by the user and one or more of the user's preferences. As a non-limiting example, an authenticated (e.g. logged in) user may be authorized to perform a specific action, such as updating the content on the website. If the user has taken some action to verify their identity and has been authenticated, the browser cookie may be set to verify the user's identity in some way.

The web content provided for the website and/or the one or more web applications may be classified as either static (images, JavaScript, Cascading Style Sheets (CSS), HTML) or dynamic (rendered HTML) in nature. Static content (including the program files which generate dynamic content, described below) typically reside in a file storage and/or data storage on one or more server computers, possibly within network storage, as described herein. In such a static-content environment, a web server's purpose is purely presentation—fetching static content stored on the one or more servers.

Dynamic content, unlike static content, may include web pages rendered dynamically to account for changing content (i.e. blog posts) or specialized for recognized users (i.e. logged in or tracking a cart). In other words, web pages utilizing such dynamic content may include "user centric" or "user specific" data such as personalized greetings or profile pictures. Web pages utilizing dynamic content may also include non user-specific dynamic content such as a home page or a blog forum. A significant percentage of websites are built upon a relatively small subset of web applications utilizing such dynamic content. These websites include, as non-limiting examples, blogging websites (e.g. WORDPRESS, LIVEJOURNAL), content management systems (e.g. DRUPAL, JOOMLA), shopping carts (e.g. ZENCART, AGORACART) forums (e.g. SIMPLEMACHINESFORUM, PHPBB, BBPRESS), customer support software applications, etc.

Many of these web applications are written in programming languages used to present dynamic content, such as PHP, ASP, ASP.NET, CGI/Perl, proprietary scripting languages etc. As these programming languages are interpreted and compiled and the content is rendered, each discrete page request by the same or other users may repeat many (or all) of the same tasks executed by previous requests. Furthermore, dynamic content is often generated by the result set of a database query. The discrete page requests and database queries create unnecessary overhead and utilization on the infrastructure (web servers, databases, file storage, and networking) which manifests in degraded performance for the site in question and possibly other sites utilizing the same shared resources.

A niche of specialized software known as 'HTTP accelerators' and/or 'reverse proxies' have emerged and are designed to expedite request response and reduce system utilization, both of which lead to improved end-user experience and greater scalability to the service provider. HTTP accelerators/reverse proxies improve performance in part by caching objects in a highly optimized way. In the case of static requests, this eliminates the network traffic created by the web server fetching content from a file storage and/or data storage. In the case of dynamic content, this eliminates the computational overhead required by the web server making frequent and numerous database calls.

In addition, caching may eliminate a significant amount of computational overhead created by compiling the script for interpreted languages to binary opcode. As a non-limiting example, a single page for an application in such interpreted languages could be traversing thousands of lines of script, possibly from multiple files, then converting it into binary code. Thus, use of reverse proxies may result in dramatically increased performance and significant reduction of overhead on infrastructure.

Applicant has determined that presently existing systems and methods do not provide optimal usage of such proxy servers. Presently existing systems and methods cannot optimally programmatically determine what content is "generic" (e.g. can be cached) and what content is user specific (e.g. cannot be cached).

Currently existing systems and methods contain no rules or standards which govern caching behavior policies of such proxy servers. By extension, this means that a hosting provider has no control over such server behaviors because the hosting provider's customer, the site owner, has complete discretion over the content and functionality of the hosting environment. In theory, if a single site owner only controls a single web application, the query string could be more easily analyzed and interpreted, but if multiple web applications for multiple customers exist behind a proxy server, the programmatic determination of when a request is a request for action vs. a request to view content may be application specific, making this determination more difficult.

For example, a login page for one website may contain a URL such as https://mydomain.com/?login=true&auth=no&somethingelse=false with clearly discernable login information, while another website may encode the login information in the query string so it is unreadable by others, such as "https://mydomain.com/?x=abcdefg&y=qrstuvwxyz."

Without rules or standards governing caching behavior, currently existing systems and methods may rely on a variety of "workaround" solutions. One possibility is to identify static and dynamic content, cache the static content and render the dynamic content. At first glance, this seems like a complete solution, since an overwhelming amount of web activity is GET based, and a majority of caching policies consequently deal with how to handle GET requests. As seen in the examples above, however, this is not a tenable strategy because of the challenges introduced in a caching policy logic based on examination of the GET query string. The content and functionality of such web pages may also be application specific, so an environment with multiple web applications may create inconsistent caching results.

Another possibility is to simply not cache HTTP POST requests containing "action" request or containing something in the header space that is very specific to that unique request. This is also not a very effective strategy, since, as previously stated, a majority of web activity is GET based. The problem created by this approach is that once the POST to login or performance of some action happens, much of the remainder of the user's session is generally going to be using GET based, which typically contains some clue to the web server about content of what to display. As an example, if a user used POST to log a comment, and did not see the comment on the website, the user may see only the cached content and may continue trying to post the comment with no results.

Thus, systems and methods are needed which provide optimal usage of proxy servers by creating a caching policy to accelerate responses to both HTTP GET and HTTP POST requests across a variety of existing hosted web applications.

Figure 2:
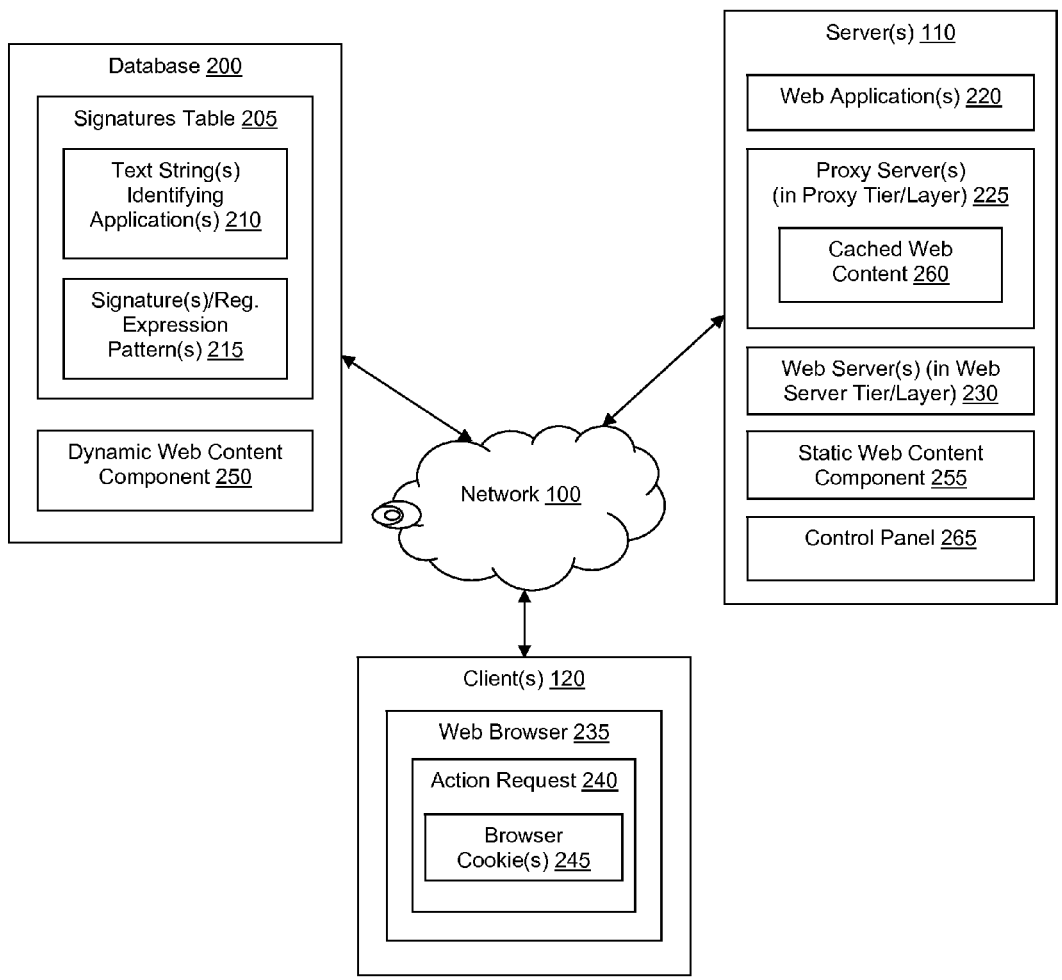
FIG. 2 is a system environment illustrating a possible embodiment of a system for improving and accelerating hosting performance.

FIG. 1 illustrates a streamlined environment and FIG. 2 illustrates a more detailed embodiment of a system for accelerating hosting performance that may comprise a database 200 (possibly within a database tier of a multitier server architecture and/or within data storage 130) and one or more servers 110 hosting one or more web applications 220, one or more proxy servers 225 (possibly in a proxy tier of a multitier server architecture) and one or more web servers 230 (possibly in a web server tier of a multitier server architecture). The database 200 and the one or more servers 110 may be communicatively coupled to a network 100.

The example embodiments illustrated herein place no limitation on network 100 configuration or connectivity. Thus, as non-limiting examples, the network 100 could comprise the Internet, the public switched telephone network, the global Telex network, computer networks (e.g., an intranet, an extranet, a local-area network, or a wide-area network), wired networks, wireless networks, or any combination thereof.

System components may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PP-PoE), and/or any combination thereof.

The database 200 (and/or any other database described herein) may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

The database 200 may or may not store a text string 210 used to identify one or more web applications 220 hosted on the one or more servers 110. As a non-limiting example, the database 200 may contain a table named "Signatures" 205. This signatures table 205 may comprise a database table containing at least two columns. One of the columns may be labeled, as a non-limiting example, "Application." The application field for records within the signatures table 205 may be populated with a text string identifying one or more web applications 220 such as "Wordpress," "Community," or any other text string used to identify the one or more web applications 220 hosted on the one or more servers 110.

For each of the text strings identifying the one or more web applications 220, or even if the database 200 does not store a text string, the database 200 may store a signature 215. Each signature 215 may contain a regular expression pattern identifying a session state for the associated web application 220. This session state may indicate that the associated web application 220 is able to perform an action in response to a request 240 from a client 120. The web applications 220 hosted on the one or more servers 110, the signature 215 for each of the web applications 220 and the request 240 from the client computer(s) 120 are described in greater detail herein.

To continue with the non-limiting example above, the second column in the two-column table 205, or a single column in a single or multiple column table 205 in the database 200 may be labeled "Signatures." The signature field for records within the signatures table 205 may be populated with a regular expression pattern such as "wordpress_%," "MemberId1=%," or any regular expression pattern 215 used to identify a session state for each of the web applications 220, and to indicate that the one or more web applications 220 are able to perform an action in response to a request 240 from the client 120.

The one or more servers 110 (and/or any other server described herein) may be any computer or program that provides services to other computers, programs, or users either in the same computer or over a computer network 100. As non-limiting examples, the one of more servers 110 could be application, communication, mail, database, proxy 225, fax, file, media, web 230, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

The one or more servers 110 may exist within a server cluster, as illustrated. These clusters may include a group of tightly coupled computers that work together so that in many respects they can be viewed as though they are a single computer. The components may be connected to each other through fast local area networks 100, which may improve performance and/or availability over that provided by a single computer. In some embodiments, the multiple computers acting as one may be behind a hardware or software load balancer, as are known in the art. This load balancing functionality may be included in the proxy/web accelerator hardware and/or software disclosed herein.

The one or more servers 110 and/or the server cluster may be configured in a multi-tier/multi-layer architecture, including a proxy tier/layer 225, a web server tier/layer 230 and a database tier/layer. These tiers/layers may contain one or more proxy servers 225, one or more web servers 230 and one or more database servers respectively.

The one or more servers 110 may comprise a computer-readable storage media storing instructions that, when executed by a microprocessor, cause the server(s) 110 to perform the steps for which it is configured. Such computer-readable media may comprise any data storage medium capable of storing instructions for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions may, as non-limiting examples, comprise software and/or scripts stored in the computer-readable media that may be stored locally in the one or more servers 110 or, alternatively, in a highly-distributed format in a plurality of computer-readable media accessible via the network 100, perhaps via a grid or cloud-computing environment.

Such instructions may be implemented in the form of software modules. Each module described herein may comprise a self-contained software component that may interact with the larger system and/or other modules. A module may comprise an individual (or plurality of) file(s) and may execute a specific task within a larger software and/or hardware system. As a non-limiting example, a module may comprise any software and/or scripts running on one or more servers 110 containing instructions (perhaps stored in computer-readable media accessible by the server computer's computer processor) that, when executed by the computer processor, cause the server computer to perform the steps for which it is configured.

The software modules implemented within the server(s) 110 may use query languages (e.g. MSSQL, MySQL, T-SQL, "NoSQL" or "NewSQL" solutions, etc.) to retrieve the content from data storage 130. Server-side scripting languages such as ASP, PHP, CGI/Perl, proprietary scripting software/modules/components etc. may be used to process the retrieved data. The retrieved data may be analyzed in order to determine information recognized by the scripting language, information to be matched to those found in data storage 130, availability of requested information, comparisons to information displayed and input selected from the user interface or any other content retrieval within the method steps disclosed herein.

The one or more servers 110 may include one or more proxy servers 225. These proxy servers 225 may comprise one or more intermediary services between the one or more servers 110 and one or more client computers 120, described in more detail herein. The one or more proxy servers 225 may be configured to accelerate hosting by caching, for each of one or more web applications 220, a dynamic component 250 and a static component 255 of a web content. Responses to requests for actions 240 by the one or more servers 110 may be accelerated because the caching of the static 255 and/or dynamic 250 component of the web content 260 may eliminate computational overhead and network traffic created by the one or more web servers 230 fetching content from file storage on the one or more server computers 110. The one or more proxy servers 225 may also eliminate computational overhead and network traffic created by numerous calls to the database 200.

The one or more servers may receive a request 240, according to input received from a user by way of a user interface on a client 120, for an action to be performed by the one or more servers 110, possibly using the one or more web applications 220 hosted thereon. The client 120 may be operated by one or more users, may be communicatively coupled to the network 100 and may be any computer or program that provides services to other computers, programs, or users either in the same computer or over a computer network 100.

As non-limiting examples, the client computer 120 may be a desktop computer, a laptop computer, a standalone computer, a hand held computer, a terminal, a television, a television set top box, a cellular phone, a wireless phone, a wireless hand held device, a "smart" phone, a personal digital assistant (PDA), an Internet access device, a rich client, thin client, or any other client functional with a client/server computing architecture which may contain an operating system, a full file system, a plurality of other necessary utilities or applications or any combination thereof on the client 120. The client 120 may also be any application, communication, mail, database, proxy, fax, file, media, web, peer-to-peer, etc.

Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof. Client software may be used for authenticated remote access to the one or more servers 110, described herein. These may be, but are not limited to being accessed by a remote desktop program and/or a web browser 235, as are known in the art.

The user interfaces displayed on the client(s) 120 and/or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc.

One or more web servers 230, may handle and respond to the request 240 from the client computer 130. If the request is for a static component 255 of a web content, the web server 230 may be configured to retrieve the static component 255 of the web content from the one or more server computers 110.

In some embodiments, the static component 255 and/or files which are used to render the dynamic component 250 may be stored in a file storage (possibly working in conjunction with the data storage 130) on the one or more servers 110. The data storage 130 may be any computer components, devices, and/or recording media that may retain digital data used for computing for some interval of time and may include the database 200. The storage may be capable of retaining stored content for any data requested, on a single machine or in a cluster of computers over the network 100, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

The web server may also render a dynamic component 255 of the web content. Once rendered, the web server 230 may then transmit the web content, including the static component 255 and the dynamic component 250 of said web content to a client computer 120 to be displayed on the client 120.

Although the example embodiments herein show a request 240 for static and/or dynamic components of a website content to be rendered, cached and/or displayed on the one or more clients 120, these example embodiments should in no way limit the one or more actions 240 requested which may be performed by the one or more servers 110. In short, the request for action 240 may include any inbound request 240 made of the one or more servers 110 for the one or more servers 110 to perform some action, possibly by way of the one or more web applications 220.

As non-limiting examples, in addition to the illustrated actions of requesting, rendering and/or caching static and/or dynamic web content, actions requested 240 and performed by the one or more servers 110 may include logging a user into one of the web applications 220, writing a comment on one of the web applications 220, rating the content of the web applications 220, voting for various options, opinions etc. in the content of the one web applications 220, etc. In other words, the request 240 may include any request 240, beyond simply viewing content, for the servers 110 to perform.

Upon receiving the request for action 240, the one or more servers 110 may determine whether the request includes a browser cookie 245 as described herein. The one or more servers 110 and/or proxy servers 225 may determine whether the browser cookie 245 is included in the request 240 by searching the header space of one or more requests 240 for the browser cookie 245.

If the one or more proxy servers 225 determine that the request 240 includes a browser cookie 245, the one or more proxy servers 225 may compare the browser cookie 245 with the regular expression pattern for the signature 215 of the associated web application 220 stored in the signatures table 205 in the database 200. If the one or more proxy servers 225 determine that the browser cookie 245 matches the regular expression pattern 215, the one or more proxy servers 225 may perform the action requested 240 by the user, and/or may pass the request through to the one or more web servers in a web tier/layer 230.

Thus, if the browser cookie 245 matches the regular expression pattern 215, the one or more servers 110 and or proxy servers 225 may determine that the user has properly identified themselves and has been properly authenticated to access the one or more servers 110 and/or to use the web application(s) 220 hosted on the one or more servers 110. As a non-limiting example, if the browser cookie 245 matches the appropriate regular expression pattern 215, the one or more servers 110 may determine that the user creating the request is logged in to a user account for the one of the web applications 220. The one or more servers 110 may further forward the request 240 to the web server(s) 230 which may be configured to log the user into the one or more web applications 220, grant access for the user to access and update the dynamic component 250 of the web content and update and retrieve the dynamic component 250 of the web content from the database 220.

In other embodiments, if the browser cookie 245 matches the regular expression pattern 215, the one or more servers 110 and/or proxy servers 225 may determine that the user creating the request otherwise has access to make requests 240 for updates to the status of the one or more web applications 220. Such access may be granted using an authentication software (e.g. CAPTCHA, guest account, etc.) to verify that the user is not a bot and/or is otherwise authorized to make the requests 240 or updates to the content of the one or more web applications 220. A dynamic portion of the web content 250 may then be updated by the user and displayed accordingly.

The dynamic component 250 of the web content for each of the one or more web applications 220 and/or for each of the users may be stored in the database 200. This dynamic component 250 may be content specific to the one or more web applications 220, such as a blog post or shopping cart, or may be "user centric" or "user specific," such as a personalized greeting or customized portfolio image for the user.

In these embodiments, if the one or more server computers 110 recognize the user as being authenticated and authorized to access and/or update a dynamic component of a website content 250, the one or more server computers 110 may be further configured to request an update to and/or a retrieval of the dynamic component 250 of said web content from the database 200, via a database query. The dynamic component 250 may then be combined with the static component 255, and the web content, including the dynamic component 250 and the static component 255 may be transmitted to the client computer 130 for display. In some embodiments, the web content may be located, rendered and/or updated by way of the one or more web applications 220.

If the one or more servers 110 and/or proxy servers 225 determine that the browser cookie 245 does not exist or does not match the regular expression pattern in the signature 215, the one or more servers 110 and/or proxy servers 225 may determine that a session state for the user is not maintained for the one or more web applications 220 and that the user is therefore not logged in and/or is otherwise not authenticated/authorized to request the action to be performed by the one or more servers 110 (e.g. forwarding the request to the web server tier to update a dynamic component 250 of a web content).

In some embodiments, the static component 255 and/or the dynamic component 250 of the web content may be cached in the proxy server 225 according to the caching policies described herein, and may be transmitted to the client computer 120. To accomplish this, a web hosting entity, which administers and/or hosts a web hosting community, may analyze the browser cookies 245 created and used by each of the one or more web applications 220. This analysis may be used by the web hosting entity to create the signatures including the crafted regular expression pattern 215 associated with each of the one or more web applications 220. The regular expression pattern in the signature 215 may be crafted to match the cookie 245 created by the associated web application 220. The web hosting entity may then store the signature including the crafted regular expression pattern 215 in the database 200, possibly in the signatures database table 205 as described in the example above.

In some embodiments, the web hosting entity may compile this information together into a library of configurations in the database 200. These configurations may be one or more caching configurations, which include instructions for one or more proxy servers 225 to cache a static component 255 and/or a dynamic component 250 of a web content into a cached web content 260 for a hosted and displayed website, possibly including the one or more web applications 220.

Non-limiting example embodiments of such a web hosting community may include a web hosting community designed to offer the one or more web applications to be downloaded, hosted and installed by one or more users, possibly onto the one or more servers 110 (e.g. GO DADDY'S HOSTING CONNECTIONS). The one or more web applications 220 may include, as non-limiting examples, one or more customer support software applications, one or more blogging software applications, one or more content management systems software applications, one or more shopping cart software applications, one or more web forum software applications, one or more social interaction software applications, or any other now-known or later-developed web application with a browser cookie 245 containing a text pattern which may be compared to a regular expression pattern 215 to determine if the browser cookie 245 matches the regular expression pattern 215.

When one or more users join the web hosting community, they may be assigned a user identification. This user identification may be a unique username and/or password, or any other means of authentication (e.g. CAPTCHA, guest account, etc.) used to determine which of the one or more web applications 220 are in use by the one or more users. The one or more servers 110, including the one or more proxy servers 225, may be configured to track the use of the one or more web applications 220 in use by the one or more users by tracking the one or more associated browser cookies 235.

In some embodiments, the one or more proxy servers 225, in addition to comprising one or more intermediary services between the client computer 120 and the one or more servers 110, may also be one or more reverse proxy servers that function in a reverse proxy layer within a cluster of servers 110. A reverse proxy may comprise a proxy server 225 which acts as a proxy for in-bound traffic to several servers 110 hidden behind a single IP address (e.g. a cluster of web servers 110 all serving content for the same domain) as opposed to a "forward proxy" which acts as a proxy 225 for out-bound traffic. The reverse proxy may also distribute the load to several back end servers 110, each server 110 possibly serving its own application area.

The reverse proxy may be installed in the neighborhood of the cluster or server farm 110 and may also be used in conjunction with load balancing. These one or more proxy servers 225 and/or the one or more reverse proxy servers may be configured to accelerate responses to requests 240 from the one or more client computers 110 by caching static 255 and/or dynamic 250 components of a web content 260 to be displayed by way of the one or more web applications 220.

Caching the static 255 and/or dynamic 250 components of the web content 260 may be accomplished according to a caching configuration of the one or more proxy servers 225, possibly for each of the web applications 220 hosted on the one or more servers 110. These caching configurations may be made up of one or more rules or policies for one or more behaviors for the one or more proxy servers 225. The rules or policies within the caching configuration for each of the web applications 220 may define what makes up the static 250 and/or dynamic 250 component of the web content. These rules or policies may also define how, when and for how long to cache the static component 255 and/or the dynamic component 250 of the web content 260 on the one or more proxy servers 225 for each of the web applications 220.

For requests 240 for static web content 255, use of these caching configurations may eliminate the need for a web server 230, described herein, to fetch a static component 250 of a web content from the one or more servers 110.

For requests 240 for web content that include a dynamic 250 and/or static 255 component, use of these caching configurations may eliminate a computational overhead created by repeatedly interpreting, compiling or rendering, on demand in real time, one or more executed scripts on the one or more servers 110. These caching configurations may also eliminate computational overhead created by one or more repeated database 200 queries performed by the one or more servers 110.

In some embodiments, the caching configuration for each of the one or more web applications 220 may be defined in a configuration software application (not shown). This configuration software application may be one or more software modules hosted and/or executed on the one or more servers 110 and/or the one or more clients 120. The configuration software application may read the text string 210 and signature, including the regular expression pattern 215 for one or more web applications 220, from the database 200. The configuration software application may analyze the text string 210 and signature 215 to determine, according to its own internal logic, the best application of the text string 210 and signature 215 to the rules and policies within the caching configuration. The configuration software application may then determine the appropriate behavior for the one or more proxy servers 225 to cache a static 255 and/or a dynamic 255 content for that web application 220. In other embodiments, a proxy configuration syntax for the caching configuration for each of the one or more web applications 220 may be stored in the database 200.

In some embodiments, the user may set up and maintain an account to control various aspects of the one or more web applications 200, the one or more caching configurations/policies for the one or more proxy servers 225 and/or any other related aspects of the user account. Such an account may also be associated with the web hosting community. The account may be set up, and the various aspects of the one or more web applications may be administrated by way of a control panel 265 hosted on the one or more servers 110 and displayed, possibly by a browser 235, on the one or more clients 120.

The control panel 265 may be configured to receive input from a user indicating one or more of the web applications 220 selected by said user. The control panel 265 may then send instructions to the client computer to transmit the web applications 220 selected by the user to said one or more server computers 110.

Once the one or more web applications 220 selected by the user are downloaded, installed and configured by the user, possibly by way of the web hosting community, the control panel 265 may receive from the user a caching configuration for each of the one or more web applications 220 selected by the user. These caching configuration selections from the user for each of the one or more web applications 220 may be used in conjunction with the caching configurations stored in the database 200 and/or the configuration software application to configure the proxy server 225 for each of the one or more web applications 220.

In some embodiments the selection of caching configuration information by the user may include a selection of an expert level indicating the user prefers an expert level of caching or a simple level indicating that the user prefers a simple caching configuration where the proxy server only caches a static component 255 of a web content 266. The control panel 265 may then send instructions to the client computer 120 to transmit the user input to the one or more server computers 110.

The control panel 265 may also be configured to receive input from the user indicating that a static component 255 and a dynamic component 250 of a web content 260 should automatically be cached on the one or more proxy servers 110. The control panel 265 may then send instructions to the client computer 120 to transmit the user input to the one or more server computers 110.

If this option is selected by the user, the one or more proxy servers 225 may be configured to begin caching the static 255 and/or dynamic 250 components of the web content 260 according to the caching configuration for each of the one or more web applications 220. The one or more proxy servers 225 may begin caching the static 255 and/or dynamic 250 content according to, and in response to receiving the one or more web applications 220 selected by the user, the caching configuration for each of the one or more web applications 220 selected by said user and the input indicating whether the static component 255 and/or dynamic component 250 of the web content 260 should be automatically cached on the one or more proxy servers 225.

In some embodiments, a software application (not shown) may be installed and run on the one or more servers 110 and may be configured to monitor a plurality of network 100 activity in a web tier 230 and a proxy tier 225 of said one or more servers 110. If a spike is detected, the software application may register a spike of network traffic in the network 100 activity. If the one or more proxy servers 225 are configured to begin caching the static 255 and/or dynamic 250 components of the web content 260 according to the caching configuration for each of the one or more web applications 220, the software application may then be configured to dynamically configure the one or more proxy servers 225 to reflect the appropriate caching configuration for the one or more web applications 220. In other embodiments, such monitoring could also come from higher up the stack, including network or security equipment or software.

Figure 3:
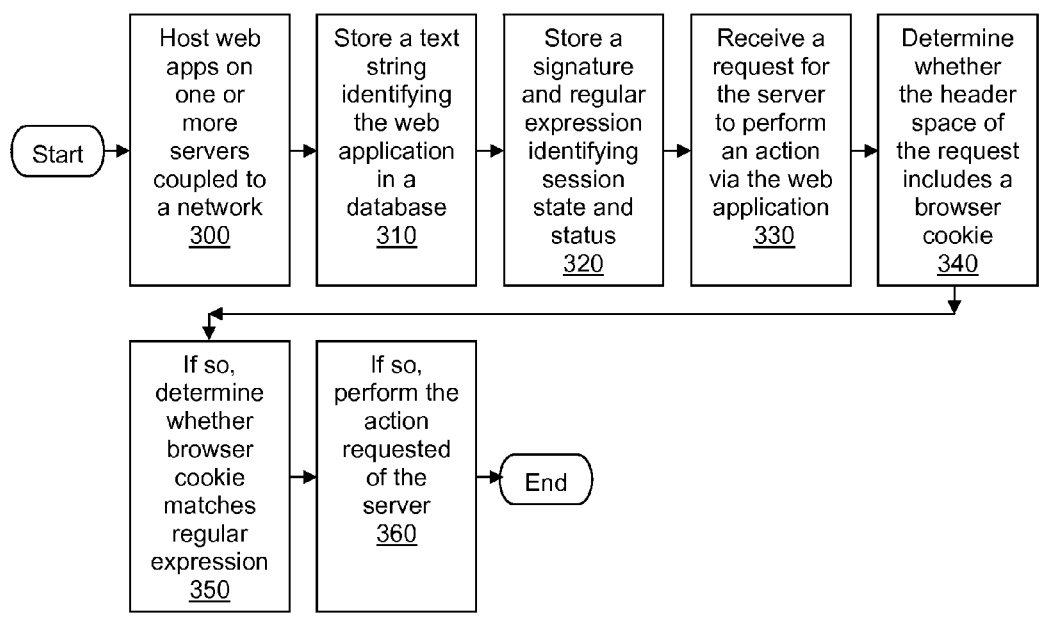
FIG. 3 is a flow diagram illustrating a possible embodiment of a method of improving and accelerating hosting performance.

FIG. 3 is a flow diagram illustrating a possible embodiment of a method that may comprise the steps of hosting one or more web applications 220 on one or more server computers 110 communicatively coupled to a network 100 (Step 300), for each of said one or more web applications 220 storing a text string 210 identifying one of the one or more web applications (Step 310) and a signature associated with the one or more web applications and comprising a regular expression pattern 215 identifying a session state indicating a status of a user of the one of said one or more web applications 220 (Step 320). The text string 210 and the signature 215 may be stored in association in a database 200 communicatively coupled to the network 100.

This embodiment may further comprise the steps of the server(s) 110 receiving, from a client computer 120 communicatively coupled to the network 100, a request for an action 240 to be performed by the one or more servers 110 via one of the one or more web applications 220 (Step 330) and determining whether the request 240 includes a browser cookie 245 (Step 340). If so, the one or more servers 110 may determine whether the browser cookie 245 matches the regular expression pattern 215 for the one of the one or more web applications 220 (Step 350), and if the browser cookie 245 matches the regular expression pattern 215, the one or more servers 110 may perform the requested action 240 (Step 360).

Figure 4:
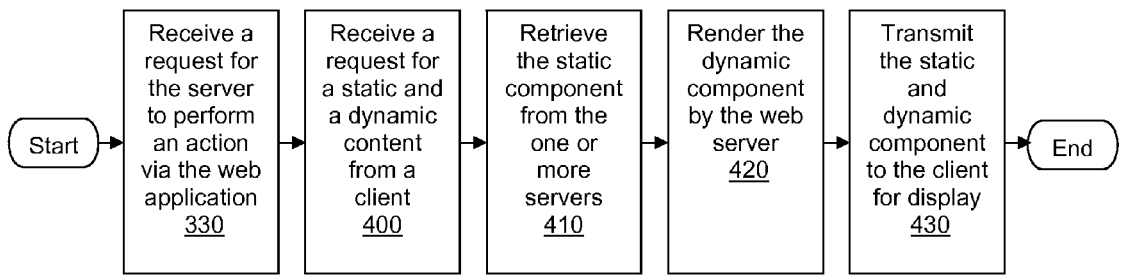
FIG. 4 is a flow diagram illustrating a possible embodiment of a method of improving and accelerating hosting performance.

FIG. 4 is a flow diagram illustrating a more detailed possible embodiment further comprising the steps of a web server 230 running on the server(s) 110 and retrieving a static component 255 of a web content comprising the static component 255 as well as a dynamic component 250 from the one or more servers 110 (Step 410), in response to the request 240 from the client 120 (Step 400), rendering the dynamic component 250 (Step 420) and transmitting the static component 255 and the dynamic component 250 of said web content to the client 120 for display (Step 430).

Figure 5:
FIG. 5 is an example interface illustrating a possible embodiment of a system and method of improving and accelerating hosting performance.

FIG. 5 shows an example interface using the disclosed structure and software modules that may be used to display the static component 255 and the dynamic component 250 of the web content (Step 430). In this example embodiment, possible static components 255 of the web page may include the "Welcome to Brand X's Website!" language and the Brand X logo, which will be common to any users of the Brand X website. Possible dynamic components 250 that are "user centric" may include the personalized greetings "WELCOME JOHN Q. CUSTOMER" and "Welcome back to Brand X, John!" and product suggestions presented based on previous purchases. Possible dynamic components that are common to all users of the Brand X website may include the current specials available to all users of the website.

Figure 6:
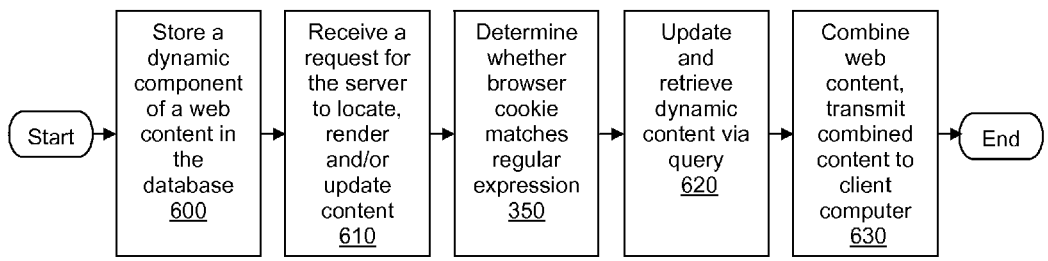
FIG. 6 is a flow diagram illustrating a possible embodiment of a method of improving and accelerating hosting performance.

FIG. 6 is a flow diagram illustrating a more detailed possible embodiment further comprising the steps of the server(s) 110 storing in the database 200, for each of the one or more web applications 220, the dynamic component 250 of the web content (Step 600). If the request 240 comprises a web content request to locate, render or update the web content via the one of said one or more web applications 220 (Step 610), and it is further determined that the browser cookie 245 matches the regular expression pattern 215 for one of the one or more web applications 220 (Step 350), the server(s) 110 may request an update to, and a retrieval of, the dynamic component 250 of the web content from the database 200 via a database query (Step 620). The web server(s) 230 may then combine the dynamic component 250 with the static component 255 of the web content, which may be stored in a file storage of the one or more servers 110 or cached 260 on the one or more proxy servers 225. The web server(s) 230 may then transmit the web content to the client computer 120 (Step 630).

Figure 7:
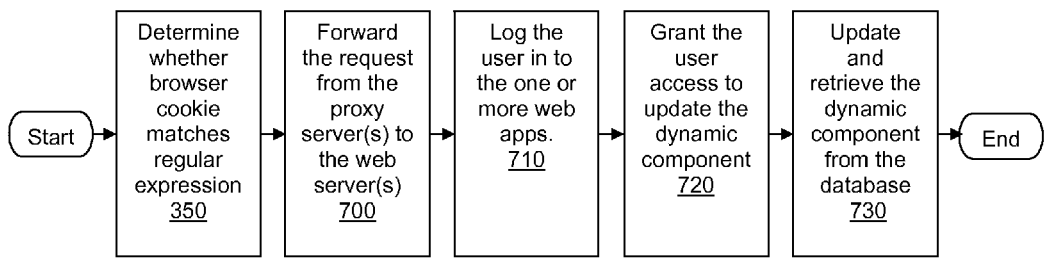
FIG. 7 is a flow diagram illustrating a possible embodiment of a method of improving and accelerating hosting performance.

FIG. 7 is a flow diagram illustrating a more detailed possible embodiment further comprising the steps of determining if the browser cookie 245 matches the regular expression pattern 215 (Step 350). If so, the one or more proxy servers 225 may forward the request 240 to the web server(s) 230 which may, in turn, accomplish the steps of logging the user in to one of the one or more web applications 220 (Step 700), granting the user access to update the dynamic component 250 of said web content (Step 710) and updating and retrieving the dynamic component 250 of the web content from the database 200 (Step 720).

Figure 8:
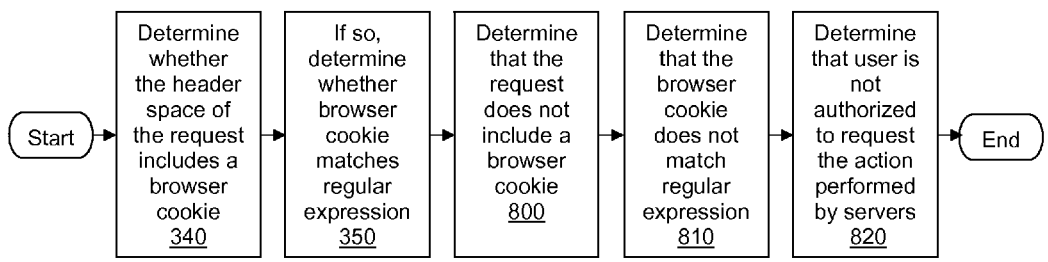
FIG. 8 is a flow diagram illustrating a possible embodiment of a method of improving and accelerating hosting performance.

FIG. 8 is a flow diagram illustrating a more detailed possible embodiment further comprising the steps of, responsive to a determination that the request 240 does not include the browser cookie 245 (Step 800), or that the browser cookie 245 does not match the regular expression pattern 215 (Step 810), the one or more proxy servers 225 determining that the user is not authorized to request the action 240 to be performed by the server(s) 110 (Step 820).

Figure 9:
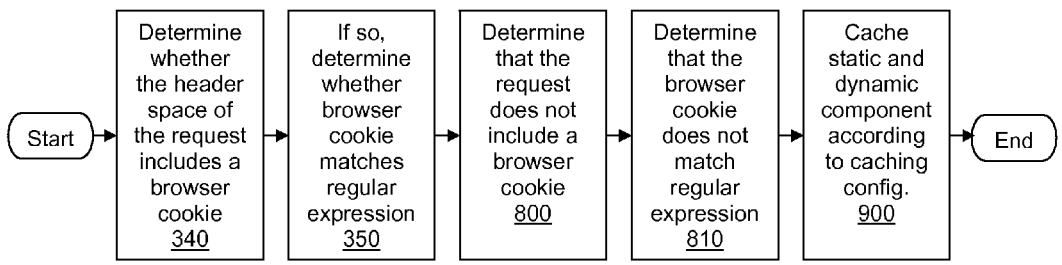
FIG. 9 is a flow diagram illustrating a possible embodiment of a method of improving and accelerating hosting performance.

FIG. 9 is a flow diagram illustrating a more detailed possible embodiment further comprising the step of the one or more proxy servers 225 caching the static component 255 and the dynamic component 250 of the web content according to a caching configuration of the one or more proxy servers 225 (Step 900). The caching configuration may comprise one or more rules or policies for one or more behaviors of the one or more proxy servers 225. These rules or policies may define, for each of the one or more software applications 220, what comprises said static component 255 and said dynamic component 250 of the web content. The rules and policies may further define how, when and for how long to cache said static component 255 and the dynamic component 250 of the web content on the one or more proxy servers 225.

Figure 10:
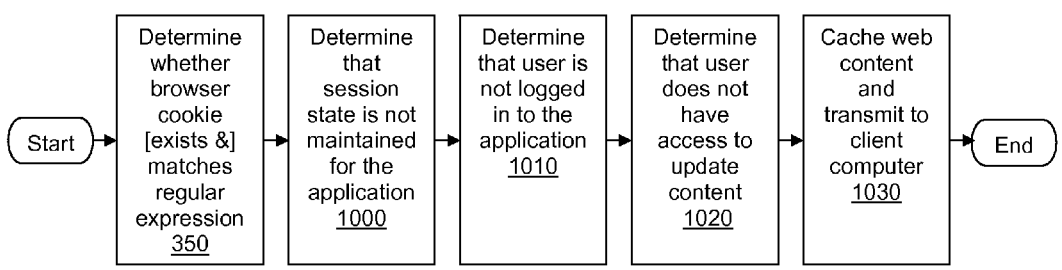
FIG. 10 is a flow diagram illustrating a possible embodiment of a method of improving and accelerating hosting performance.

FIG. 10 is a flow diagram illustrating a more detailed possible embodiment further comprising the steps of, responsive to a determination that the browser cookie 245 does not exist or does not match the regular expression pattern 215, the one or more proxy servers 225 determining that: the session state for the web application 220 is not maintained for the user for the one or more web applications 220 (Step 1000), that the user is not logged in to the one of the one or more web applications 220 (Step 1010) and that the user does not have access to update the dynamic component 250 of the web content (Step 1020). The one or more proxy servers may then cache the dynamic component 250 and the static component 255 of the web content and transmit the web content to the client computer 120 (Step 1030).

Figure 11:
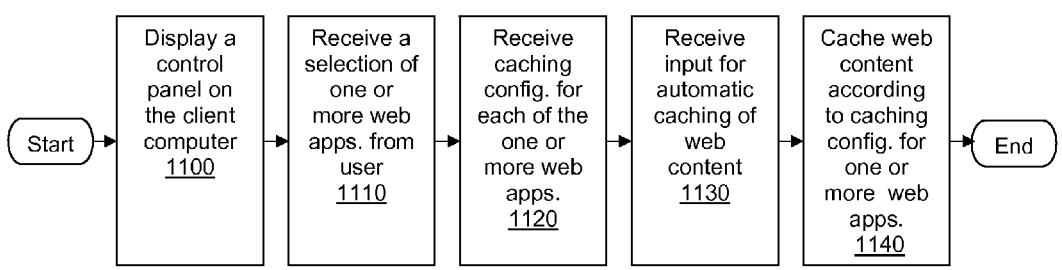
FIG. 11 is a flow diagram illustrating a possible embodiment of a method of improving and accelerating hosting performance.
Figure 12:
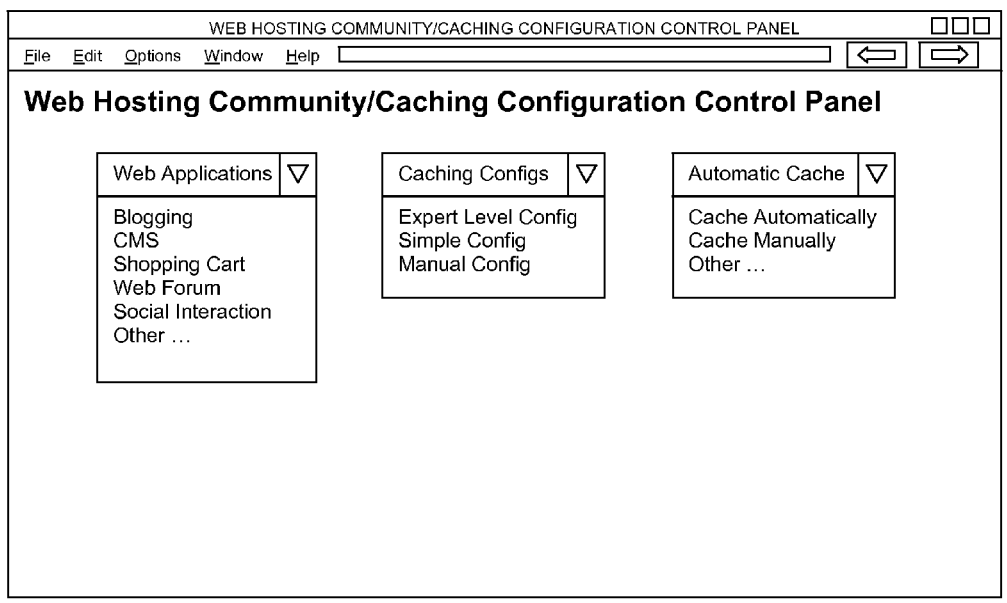
FIG. 12 is an example interface illustrating a possible embodiment of a system and method of improving and accelerating hosting performance.

FIG. 11 is a flow diagram illustrating a more detailed possible embodiment further comprising the steps of the server(s) 110 receiving input from a control panel 265 on the client computer 120 indicating a selection of the one or more web applications 220 by the user (Step 1110), receiving input indicating the caching configuration for each of the one or more web applications 220 selected by said user (Step 1120) and receiving input indicating whether the static component 255 and the dynamic component 250 of the web content will be automatically cached on the one or more proxy servers 225 (Step 1130). Responsive to receiving these items from the client 120, additional steps may include the proxy servers 225 caching the static component 255 and the dynamic component 250 of the web content according to the caching configuration for each of the one or more web applications 220. FIG. 12 shows an example interface using the disclosed structure and software modules that may be used to select web applications and to configure the caching configurations for the proxy server, including selecting an expert, simple or other level for caching and selecting automatically caching the content on the one or more proxy servers 225, or selecting other caching options.

Figure 13:
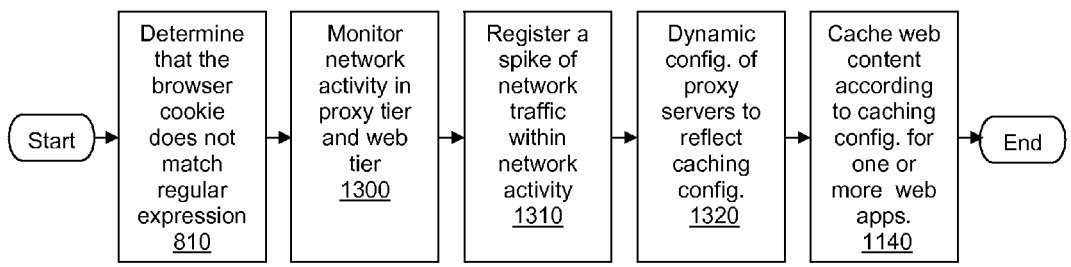
FIG. 13 is a flow diagram illustrating a possible embodiment of a method of improving and accelerating hosting performance.

FIG. 13 is a flow diagram illustrating a more detailed possible embodiment further comprising the steps of a software application external to said one or more proxy servers 225 monitoring a plurality of network activity in a web tier 230 and a proxy tier 225 within a multitier architecture for the server(s) 110 (Step 1300), registering a spike of network 100 traffic within the network 100 activity (Step 1310) and dynamically configuring the one or more proxy servers 225 to reflect the caching configuration (Step 1320).

The additional steps included in the embodiments illustrated in FIGS. 3-13 are not limited to their respective illustrated embodiments, and may be combined in several different orders and modified within multiple other disclosed embodiments. Likewise, the method steps disclosed herein may be accomplished by a software module executed on a server and/or client configured to accomplish that method step.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system, comprising: one or more server computers communicatively coupled to a network, said one or more server computers running:
   A) a database configured to store, for each of one or more web applications hosted on said one or more server computers, a signature comprising a regular expression pattern identifying a session state, said session state indicating a status of a user of said one of said one or more web applications; and
   B) one or more proxy servers configured to:
      i) store a cached web content for a website hosted by a web server, the website comprising web content, at least a portion of the web content being cached as the cached web content;
      ii) receive, from a client computer communicatively coupled to said network, a request for an action performed by said one or more server computers via one of said one or more web applications;
      iii) determine whether said request includes a browser cookie; and
      iv) responsive to a determination that said request includes said browser cookie:
         determine whether said browser cookie matches said regular expression pattern for said one of said one or more web applications;
         responsive to a determination that said browser cookie does not match said regular expression pattern for said one of said one or more web applications, transmit the cached web content to the client computer without performing the action; and
         responsive to a determination that said browser cookie matches said regular expression pattern, pass the request to said one or more server computers;
   said one or more server computers being configured to, responsive to receiving the request from the one or more proxy servers, perform said action using said one of said one or more web applications.

2. The system of claim 1 wherein said one or more web applications comprise one or more hosting applications downloaded by said user from a web hosting community onto said one or more server computers, said one or more hosting applications comprising any combination of:
   i) one or more customer support software applications;
   ii) one or more blogging software applications;
   iii) one or more content management system software applications;
   iv) one or more shopping cart software applications;
   v) one or more web forum software applications; and
   vi) one or more social interaction software applications.

3. The system of claim 1 wherein said one or more server computers are further running the web server, said web content comprising a static component and a dynamic component;
   said web server being configured, in response to receiving said request from said one or more proxy servers, to:
      i) retrieve, from said one or more server computers, the static component of the web content;
      ii) render said dynamic component; and
      iii) transmit, to said client computer for display, by said web server, said static component and said dynamic component of said web content.

4. The system of claim 3 wherein said browser cookie:
   i) comprises information:
      a) originating from said one of said one or more web applications;
      b) about an inbound connection between an Internet browser on said client computer and said web server; and
      c) comprising one or more characteristics about said session state;
   ii) is stored on said client computer;
   iii) preserves said session state for said one of said one or more web applications and said Internet browser;
   iv) is preserved, and delivered with said request, by said Internet browser;
   v) describes one or more user characteristics comprising:
      a) an identity of said user;
      b) one or more actions performed by said user; and
      c) one or more preferences of said user.

5. The system of claim 3 wherein the cached web content includes the static component of the web content and the web server retrieves the static component from the cached web content of the one or more proxy servers.

6. The system of claim 3 wherein:
   i) said one or more server computers are further configured to store in said database, for each of said one or more web applications, said dynamic component of said web content;
   ii) said request comprises a web content request to locate, render or update, via said one of said one or more web applications, said web content; and
   iii) responsive to a determination that said browser cookie matches said regular expression pattern for said one of said one or more web applications, said one or more server computers are configured to:
      a) request from said database, via a database query, an update to, and a retrieval of, said dynamic component of said web content;
      b) combine said dynamic component with said static component of said web content, said static component being stored in a file storage of said one or more server computers or cached on said one or more proxy servers; and c) transmit, to said client computer said web content.

7. The system of claim 6 wherein responsive to a determination that said browser cookie matches said regular expression pattern, said one or more proxy servers forward said request to said web server, and said web server, responsive to the action:

i) logs said user in to said one of said one or more web applications;

ii) grants access for said user to access and update said dynamic component of said web content; and iii) updates and retrieves from said database said dynamic component of said web content.

8. The system of claim 6 wherein said one or more proxy servers are further configured to cache the dynamic component in the cached web content.

9. The system of claim 3 wherein said one or more proxy servers:

i) comprise one or more intermediary services between said client computer and said one or more server computers;

ii) comprise one or more reverse proxy servers;

iii) function in a reverse proxy layer in a cluster of server computers; and iv) are configured to:
   a) read said browser cookie;
   b) determine that responsive to said browser cookie for said one of said one or more web applications not matching said regular expression pattern, said user is not authorized to request said action to be performed by said one or more server computers;
   c) accelerate hosting by caching, as said cached web content, for each of said one or more web applications, said dynamic component and said static component of said web content;
   d) eliminate, by transmitting said static component of said cached web content to the client computer when the request includes one or more static content requests, said web server fetching said static component of said web content from a file storage on said one or more server computers; and
   e) eliminate, by transmitting said dynamic component of said cached web content to the client computer when the request includes one or more dynamic content requests and said browser cookie of said request does not match said regular expression pattern, a computational overhead created by:
      a) repeatedly interpreting, compiling or rendering, on demand in real time, one or more executed scripts on said one or more server computers; and
      b) one or more database queries by said web server.

10. The system of claim 3 wherein:

i) said one or more proxy servers are configured to cache said static component and said dynamic component of said web content as said cached web content according to a caching configuration of said one or more proxy servers; and ii) said caching configuration comprises one or more policies for one or more behaviors of said one or more proxy servers, said one or more policies defining, for each of said one or more web applications:
   a) what to identify as said static component and said dynamic component of said web content;
   b) how to cache said static component and said dynamic component of said web content on said one or more proxy servers;
   c) when to cache said static component and said dynamic component of said web content on said one or more proxy servers; and
   d) how long to cache said static component and said dynamic component of said web content on said one or more proxy servers.

11. The system of claim 10 wherein:

i) said caching configuration for each of said one or more web applications is defined in a configuration software application external to said database; and ii) said configuration software application is configured to update said one or more proxy servers, according to said regular expression pattern, to reflect said caching configuration.

12. The system of claim 10 wherein a proxy configuration syntax for said caching configuration for each of said one or more web applications is stored in said database.

13. The system of claim 10 wherein said caching configuration for each of said one or more web applications is written and compiled by a web hosting entity hosting a web hosting community, said web hosting community facilitating the download, installation, and use of said one or more web applications on said one or more server computers by said user, and wherein:

i) said one or more web applications are written in a programming language configured to:
   a) present said dynamic content via one or more web pages rendered dynamically on said client computer; and
   b) recognize if said user is logged in to said one of said one or more web applications or is tracking a shopping cart; and ii) said one or more caching configurations are compiled into a configuration library in said database.

14. The system of claim 13 wherein a user identification is assigned to said user upon joining said web hosting community, said user identification identifying one or more of said one or more web applications in use by said user, wherein said one or more proxy servers track the use of one or more browser cookies from said one or more of said one or web applications in use by said user.

15. The system of claim 10 wherein said one or more proxy servers are configured, responsive to a determination that said browser cookie does not match said regular expression pattern, to:

i) determine that said session state for said web application is not maintained for said user for said one of said one or more web applications;

ii) determine that said user is not logged in to said one of said one or more web applications;

iii) determine that said user does not have access to update said dynamic component of said web content; and iv) transmit said cached web content to said client computer.

16. The system of claim 10 further comprising a control panel, hosted on said one or more servers, displayed on said client computer and configured to:

i) receive and transmit to said one or more server computers input indicating a selection of said one or more web applications by said user;

ii) receive and transmit to said one or more server computers input indicating said caching configuration for each of said one or more web applications selected by said user; and iii) receive and transmit to said one or more server computers input indicating whether said static component and said dynamic component of said web content will be automatically cached on said one or more proxy servers.

17. The system of claim 16 wherein said control panel comprises:
   i) an expert level interface component configured to receive input from said user indicating that said user prefers an expert caching configuration causing said one or more proxy servers to cache said static component and said dynamic component of said web content for one or more users which are not logged in to said one or more web applications; and
   ii) a simple level interface component configured to receive input from said user indicating that said user prefers a simple caching configuration causing said one or more proxy servers to only cache said static component of said web content, said static component comprising any combination of:
      a) one or more text files;
      b) one or more image files;
      c) one or more client-side script files;
      d) one or more cascading style sheet files; and
      e) one or more hypertext markup language files.

18. The system of claim 16 wherein said one or more proxy servers are configured to begin caching said static component and said dynamic component of said web content according to said caching configuration for each of said one or more web applications responsive to receiving from said client computer:
   i) said one or more web applications selected by said user;
   ii) said caching configuration for each of said one or more web applications selected by said user; and
   iii) said input indicating whether said static component and said dynamic component of said web content will be automatically cached on said one or more proxy servers.

19. The system of claim 10 further comprising a software application external to said one or more proxy servers configured to:
   i) monitor a plurality of network activity in a web tier and a proxy tier within a multitier architecture for said one or more server computers;
   ii) register a spike of network traffic in said plurality of network activity; and
   iii) dynamically configure said one or more proxy servers to reflect said caching configuration.

20. The system of claim 9, wherein the dynamic component comprises content-specific data and user-specific data, the one or more proxy servers being configured to cache the content-specific data as the cached web content, and to not cache the user-specific data.

* * * * *